United States Patent [19]

Morris et al.

[11] Patent Number: 4,510,254

[45] Date of Patent: Apr. 9, 1985

[54] METHOD OF TREATING ZEOLITE ORES TO REMOVE DISCOLORING IMPURITIES AND IMPROVE ITS BRIGHTNESS AND RESULTING FINELY GROUND ZEOLITE

[76] Inventors: Horton H. Morris, 1715 Waverland Dr., Macon, Ga. 31204; John R. Whyte, Jr., 1737 Graham Rd., Macon, Ga. 31211; Ellen Forbus, 96 Hardie St., Gordon, Ga. 31031; Catherine M. Dentan, 343 Orange St., Macon, Ga. 31201; David R. Collins, Rte. 1, Box 54, Irwinton, Ga. 31042

[21] Appl. No.: 573,208

[22] Filed: Jan. 23, 1984

[51] Int. Cl.³ .............................................. C04B 33/02
[52] U.S. Cl. ..................................... 501/146; 75/1 R; 502/64; 502/67; 423/328
[58] Field of Search .................... 501/146; 75/1 R, 2; 502/64, 67; 432/328

[56] References Cited

U.S. PATENT DOCUMENTS

| | | | |
|---|---|---|---|
| 1,570,854 | 1/1926 | Nordell | 209/166 |
| 2,173,909 | 9/1939 | Kritchevsky | 209/166 |
| 3,189,557 | 6/1965 | Shaler | 252/428 |
| 3,206,127 | 9/1965 | Morris et al. | 241/4 |
| 3,439,801 | 4/1969 | Morris et al. | 209/5 |
| 3,572,500 | 3/1971 | Kouloheris | 209/5 |
| 3,713,593 | 1/1973 | Morris et al. | 241/27 |
| 3,891,580 | 6/1975 | Morris et al. | 260/8 |
| 3,902,993 | 9/1975 | Houser et al. | 209/166 |
| 3,934,825 | 1/1976 | Delfosse et al. | 241/16 |
| 3,980,240 | 9/1976 | Nott | 241/20 |
| 3,990,642 | 11/1976 | Nott | 241/20 |
| 4,247,524 | 1/1981 | Leonard | 423/118 |
| 4,401,633 | 8/1983 | Sun | 423/118 |
| 4,401,634 | 8/1983 | Sun | 423/118 |

FOREIGN PATENT DOCUMENTS

| | | |
|---|---|---|
| 890249 | 1/1972 | Canada. |
| 45-41044 | 12/1970 | Japan. |
| 48-99402 | 12/1973 | Japan. |
| 1221929 | 2/1971 | United Kingdom. |

OTHER PUBLICATIONS

Chem. Abs. 1955, vol. 49, 14239b and 14240a, Abstract of Japanese Patent No. 5369, "Liberation Of Iron From Zeolite", Tomokuro Matsubara.
Chem. Abs. 1973, vol. 78, 74175t-Abstract of E. German Patent 85,072, "Purifying Adsorbents Consisting Of Synthetic Zeolites From The Residues Of Product Liquids", Enke, et al.
Chem. Abs. 1976, vol. 84, 84:107549x, "Properties And Use Of The Itaya Zeolite", Takasaka.
Kobor et al, "Hungarian Zeolite In The Paper Industry", 1968, *Papiripar* 12(2), 44–50, Hungary.
Mondale et al, "Beneficiation Of Natural Zeolites From Bowie, Arizona: A Preliminary Report", 1978, *Natural Zeolites, Occurrence, Properties, Use*, pp. 527–537.

*Primary Examiner*—James Poer
*Attorney, Agent, or Firm*—Fisher, Christen & Sabol

[57] ABSTRACT

A method of treating zeolites to remove therefrom discoloring impurities and improve the brightness thereof, comprising the steps of mixing a pulverized sedimentary zeolite ore with a dispersant and water to form a dispersed aqueous zeolite slurry, degritting the resulting slurry, removing fines containing discoloring impurities from the degritted slurry, thereafter subjecting the zeolite slurry to a fine media milling, removing fines containing discoloring impurities from the resulting fine milled slurry, subjecting the fine milled slurry to magnetic separation to remove magnetic discoloring impurities, bleaching the resulting zeolite slurry and then recovering the zeolite in dry form from the resulting slurry. The dry finely ground zeolite made by this method has a particle size of at least 85% below 2 μm and a Tappi brightness of at least 90. It also exhibits the ion exchange characteristics of zeolites and possesses a bulk density (loose or packed) of about half or less of high quality kaolin clay pigments.

41 Claims, 2 Drawing Figures

METHOD OF TREATING ZEOLITE ORES TO REMOVE DISCOLORING IMPURITIES AND IMPROVE ITS BRIGHTNESS AND RESULTING FINELY GROUND ZEOLITE

BACKGROUND OF THE INVENTION

1. Field of the Invention

The present invention relates to methods for treating zeolite ores such as clinoptilolite ore for the purpose of removing discoloring impurities and brightening the zeolite and thus rendering it valuable for use in industries such as the paper industry and the coatings industry in the production of high quality products and more particularly refers to methods of converting zeolites into high quality, high brightness pigments, extenders or fillers comparable to high quality, commercial kaolin clay pigments and fillers but, in loose or packed bulk form, are only about half as dense as kaolin clay pigment.

2. Prior Art

Natural zeolites are a group of at least 34 minerals which chemically, are crystalline, hydrated aluminosilicates of alkali and alkaline earth elements usually sodium, potassium, magnesium, calcium, strontium, and barium. Structurally, the minerals are framework aluminosilicates consisting of infinitely extending three dimensional networks of $AlO_4$ and $SiO_4$ tetrahedra linked to each other by the sharing of all oxygens. Zeolite minerals are three-dimensional framework aluminosilicates of alkali and alkaline earth cations predominately sodium and calcium which contain highly variable amounts of water within the voids in the frameworks. The zeolite materials have open structures containing cavities filled by water molecules which are interconnected by pores or channels. When zeolite minerals are activated by heating to temperatures of over 100° C., the crystal structure remains intact and the cations become coordinated with the oxygen along the inner surfaces of the cavities. Upon activation, a zeolite crystal becomes a porous solid consisting of up to 50 percent void space permeated by cavities which are interconnected by channels having diameters ranging from 2 to 7 Angstroms. The result is a natural analog of a synthetic molecular sieve which, depending on the channel size, can absorb gases and effectively separate mixtures of gases.

Deposits of zeolites are believed to have been formed from volcanic ash or lava flows coming into contact with marine waters, fresh water lakes, ground waters or saline shallow lakes. The alkalinity of the water and the type and concentration of ions it contained determine the species of the zeolite formed. Zeolite deposits may occur wherever volcanic activity has taken place near saline or alkaline water and where a sufficient amount of time has passed to effect the evolution of the minerals. There are a number of sizable zeolite deposits in Europe, the Far East, Australia, South America, and Africa. Of the more than 40 natural zeolite minerals recognized, only six are reported to occur in sufficient tonnage and purity (80% to 90% pure) to be of serious commercial interest. The six major zeolites are chabazite, mordenite, clinoptilolite, erionite, phillipsite, and analcime. Typical natural zeolites also include ferrierite, heulandite and laumontite.

Natural zeolites are mined, processed and used for their ion exchange capacity in purifying acid gases, e.g., methane or natural gas that contains hydrogen sulfide; decontaminating radioactive waste streams to recover radioactive materials, such as Cs 137 from nuclear reactor effluents; or treatment of agricultural wastes and runoff and sewage. Processing of natural zeolites prior to use includes pulverizing, classifying and calcining to drive water out of the pores.

The natural zeolites are also useful as starting materials for the preparation of synthetic zeolites. U.S. Pat. Nos. 4,401,633 and 4,401,634 describe methods for making synthetic zeolite A by heating heulandite or clinoptilolite in aqueous sodium hydroxide, filtering and reacting the filtrate with sodium aluminate to precipitate zeolite A. A similar process is disclosed in a Russian article by A. Yu. Kruppenikova, et al., titled Phase Transitions in the Recrystallization of Clinoptilolite, published by P. G. Melikishodi Institute of Physical and Organic Chemistry of the Academy of Sciences of the Georgian S. S. R. The preparation of synthetic zeolite A by hydrothermal treatment of clinoptilolite in a slurry of sodium aluminate and aqueous sodium hydroxide is disclosed in U.S. Pat. No. 4,247,524.

Attempts to upgrade the zeolite content in predominantly chabazite ores by size classification using wet cycloning and the shaking table are described in a paper entitled Beneficiation of Natural Zeolites From Bowie, Ariz.: A Preliminary Report by K. D. Mondale, F. A. Mumpton and F. F. Aplan, pp. 527–537, Zeolite '76, published by State University College, Brockport, N.Y., in 1976.

U.S. Pat. No. 3,189,557 describes a process for removing calcite fines from a montmorillonite ore by dry milling, screening to remove calcite fines, forming an aqueous slurry, centrifuging the slurry to remove calcite fines, adding a humectant and drum drying the resulting humectant-containing slurry. There results a rapidly rehydratable material useful as a beer stabilizer and purifier or as an additive to laundry starch.

U.S. Pat. Nos. 2,173,909 and 3,902,993 disclose the use of air flotation for treating zeolitic ores to separate zeolite from the amorphous gangue present in said ores.

Synthetic zeolites have been used as catalyst carriers and water softeners. Numerous patent and other prior art publications are concerned with processes for regenerating or recovering the zeolitic particles from spent catalyst or water softener. Included are U.S. Pat. No. 1,570,854, Japanese Pat. No. 5369 (1954) and East German Pat. No. 85072 (1971).

It has been reported that finely ground clinoptilolite classified by wet or dry cycloning into a $-0$ $\mu$m product having a brightness of 80 has been produced in Japan (Takasaka in Funsai, 1975, 20 pp. 127–134, 142). Pulverized zeolite ore (60% of 2 to 10 or 20 $\mu$m) reportedly has been used in Japan to manufacture paper (Kokai 73,099,402; Kokai 70,041,044). Kobor et al reported in Papiripar, 1968, 12(2), 44–50 (Hung.) that Hungarian zeolite is not suited for the manufacture of wood-free paper, that the zeolite shows medium whiteness and a high degree of dispersion and that paper manufactured with zeolite as filler instead of kaolin shows increased bulk and decreased elasticity. The low brightness level of these materials render them unsuitable for use in the production of paper of the quality demanded in the United States and other parts of the world.

SUMMARY OF THE INVENTION

We have discovered a method whereby natural zeolites that are severely discolored by organic and inorganic discoloring materials can be refined to remove the discoloring impurities and produce finely divided zeolite pigments, fillers or extenders having a level of Tappi brightness never before achieved for zeolite particles. We have also discovered a method of treating zeolite ores to remove therefrom detrimental impurities, improve the brightness, ion exchange capacity and surface area thereof, and reduce the particle size thereof. The novel zeolite pigments, extenders and fillers of this invention are also characterized by the cage-like structure of natural zeolites and it is particularly surprising that the fine media milling steps of the method of this invention have failed to destroy or impair in any detectable way the cage-like crystalline structure. As a consequence, the cation exchange abilities of the zeolites resulting from the treatments of the methods of this invention are unimpaired. Of notable significance is the comparatively low loose and packed bulk densities as compared to loose and packed bulk densities of the finest kaolin clay pigments rendering the products of this invention eminently suited for the manufacture of light weight papers and other light weight products.

Figure 1:
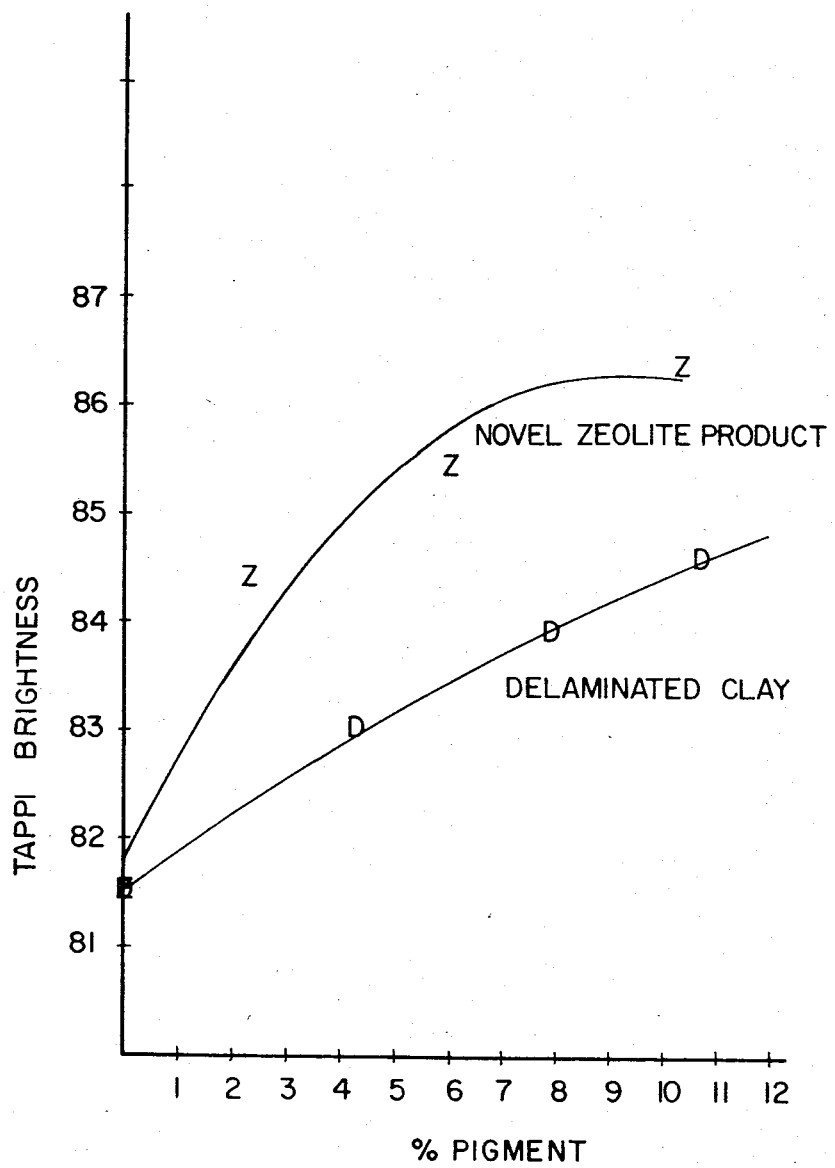
FIG. 1 is a graph wherein the TAPPI brightness is plotted against percent pigment for two papers, one made with the zeolite product of Example 1 as the filler and the other made with a commercial quality, uncalcined delaminated kaolin clay filler.

The novel method comprises the steps of:

(1) mixing a pulverized zeolite ore with a dispersant and water to disperse said zeolite and form an aqueous zeolite slurry;

(2) degritting said aqueous zeolite slurry to remove grit having a particle size of 44 μm or more;

(3) removing fines having a particle size of at least 50%, or at least 70% (typically 60%) less than 2 μm or finer and containing discoloring impurities from said degritted zeolite slurry;

(4) subjecting a mixture of the zeolite slurry after fines removal step (3) and a fine grinding media to rapid agitation to effect a fine milling of said zeolite to a particle size of at least 20%, preferably 25%, less than 2 μm., and removing said grinding media from said fine milled zeolite slurry;

(5) removing fines having a particle size of at least 40% (or 80% or 90%, typically 85%) less than 2 μm or finer and containing discoloring impurities from the fine milled zeolite slurry;

(6) subjecting said fine milled zeolite slurry after said fines removal step (3) to magnetic separation to remove magnetic discoloring impurities;

(7) bleaching the resulting zeolite slurry; and (8) recovering the zeolite in dry form from the resulting slurry.

Preferably the zeolite is double pulverized and any suitable equipment available to the ore processor may be used, for example, ball mills, hammer mills, pulverizers, etc. Following pulverization, the pulverized zeolite is mixed with a dispersant such as sodium silicate, tetrasodiumpyrophosphate, any other polyphosphate salts, dispersing agents belonging to the group of polycarboxylate salts such as polyacrylate salts including sodium, ammonium, potassium or lithium salts of polyacrylic acid, preferably the acrylate salt dispersants having average molecular weight of 500 to 10,000, most preferably 750 to 2,400. Any other suitable dispersing agent available can be employed and the specific nature of dispersant is not critical to the success of this invention. The mixing of the dispersant and pulverized zeolite can be achieved in any suitable mixing apparatus including a blunger.

In many instances the pulverized zeolite, before dispersion, is subjected to an acid washing in order to reduce the consumption of dispersant needed to provide a suitable dispersion. It is theorized that certain zeolites contain high amounts of calcium sulfate which consume large amounts of dispersant. In such cases the pulverized zeolite can be subjected to an acid wash in which it is mixed with water and an acid such as hydrochloric acid, sulfuric acid, nitric acid, phosphoric acid or any other suitable inorganic acid. For example, the pulverized ore can be mixed with water and the acid in such amounts that a slurry is produced containing from 2 to 20 wt. % of the acid (based upon the liquid component), followed by agitation of the resulting aqueous, acid, zeolite slurry. It is believed that the acid dissolves some of the gypsum ($CaSO_4 \, 2H_2O$) deposited in the zeolite ore matrix, or alternatively within the pores of the zeolite. Thereafter, the pulverized zeolite is separated from the aqueous acid liquid by any suitable means. For example, the aqueous, acid, zeolite slurry can be allowed to stand for a period of time in which the pulverized zeolite settles. Then, the supernatant aqueous, acid liquid is decanted and discarded. The remaining settled slurry is then filtered, the resulting filter cakes are diluted with fresh water and mixed as by means of a blunger followed by another filtering procedure. This cycle of filtering and blunging in water is repeated a suitable number of times to remove as much acid from the zeolite as is practical. It has been found in general that two or three cycles of filtering and blunging in water is usually adequate. In the final blunging with water an alkaline material such as sodium hydroxide is usually added in order to neutralize any residual acid in the zeolite slurry. Once the slurry has been neutralized suitable dispersant as mentioned above is added in order to disperse the slurry.

Degritting of the aqueous zeolite slurry that has been dispersed with a suitable dispersant is conveniently accomplished by screening the slurry and removing the coarse material. Generally speaking, such coarse material or grit has a particle size of 44 μm (microns) or more. Typical apparatus includes Sweco vibrating screens, shaking screens vibrating screens, and oscillating screens.

In the next step, fines having a particle size of 50% less than 2 μm or finer and which also contain discoloring impurities are removed from the degritted dispersed zeolite slurry by any suitable or convenient means and discarded. For example, a centrifuge is advantageously employed, although any other suitable fines removal procedures can be used such as fractional sedimentation, decantation or the like. In a centrifuging apparatus the fines are removed and discarded and the relatively coarser materials are retained and passed on to the next step.

After removal of fines, the zeolite slurry is mixed with a fine grinding media in a ratio of 30 to 70 volume % of the grinding media in the mixture and the mixture is subjected to rapid agitation to effect a fine milling action on the zeolite particles in the slurry. Thereafter, the grinding media is removed from the fine milled zeolite slurry. The grinding media includes sand, porcelain balls, metal balls such as iron or rubber covered iron or nickel or rubber covered nickel, aluminum oxide beads such as Alumasand A, or zirconium oxide beads commercially designated as Z-Beads. Such media is considerably larger than the particle size of the zeolite in the slurry and can range from 1/32" to about ¼", preferably 1/16" to about ⅛" diameter pellets. The grinding media can be in any suitable form, for example, it can be in the form of beads, pellets, etc. Alumasand A for example contained mainly aluminum oxide (85 to 90 wt. %) of a −8 to +12 mesh. Z-Beads are composed of zirconium oxide beads of nominal 16 mesh size. The fine media milling step (FMM I) or steps are carried out on the zeolite in aqueous slurry form and can be conducted in any suitable mill such as a Denver attrition mill or a Chicago Boiler Company Dynomill type KD-5.

After the fine media milling of the zeolite particles, it is preferable to remove and discard fines containing discoloring impurities, utilizing a procedure similar to that described above for step 3. This is called the second fines removal step FR II. The slurry from FR II is subjected preferably to another fine media milling step (FMM II) which is carried out in a manner similar to the first fine media milling step (FMM I) as described above. The slurry from the second fine media milling step (FMM II) can be subjected to a further fines removal step with or without filtering and blunging and subjected to additional fine media milling. In fact, it may be preferred to use more than one or two fine media milling steps so as to reduce as much as possible the loss of zeolite particles in the fines that are removed in subsequent fines removal steps.

After removal of fines, the resulting fine milled zeolite slurry is subjected to a magnetic separation step MS I to remove magnetic discoloring impurities. Any suitable apparatus can be used, several of which are readily available and widely used. The slurry can be passed through the magnetic separator more than once, for example, two, three or more times to remove additional amounts of magnetic discoloring impurities. In the event the slurry from fine media milling step mentioned above and the second fines removal step (FR II) is too dilute, it can be filtered and the resulting filter cakes can be diluted with fresh water and mixed by blunging to provide a slurry having an appropriate solids content etc.

After subjecting the slurry to one or two or more magnetic separation procedures, it can be subjected to a bleaching operation using an oxidative bleach such as ozone, sodium hypochlorite, ammonium persulfate, or potassium persulfate. The amount of oxidative bleach used is between 0.01% and 0.1% by weight based on the dry weight of the aqueous zeolite feed. The pH of the dispersion is adjusted by the addition of alkaline reagents to a range of pH 4.5 to 7.0, with a pH of 6 to 7 being preferred. The oxidative bleach is allowed to react for a period of time adequate to give maximum brightness increase. Other oxidizing bleaches can be used including those water-soluble inorganic or organic compounds containing in the molecule readily available oxygen capable of bleaching, such as ammonium persulfate, potassium permanganate, hydrogen peroxide and the like. Before bleaching however, it may be desirable to subject the slurry from the magnetic separation step or steps to additional fines removal steps, for example, FR III, FR IV, and/or FR V and/or additional fines removal steps, in order to increase the brightness of the zeolite in the slurry. In such cases the fines removal steps are carried out in the same manner as fines removal steps I or II as described above.

In some cases a reductive bleach is useful in improving the whiteness and brightness of the material. A commonly used reductive bleach is sodium dithionite usually added to the slurry while the pH is in the 2 to 5 range. The sodium dithionite may be used as the only bleach in some cases, or it may be used following the above-described oxidative bleach.

Prior to bleaching as described above, it may be desirable to further reduce the particle size of the zeolite in the slurry. In such instances it may also be necessary to increase the solids content of the slurry. This may be done by filtering the slurry and blunging the resulting filter cake to a slurry of the desired solids content which will be suitable for grinding in the fine media mill. Prior to grinding however, the slurry is dispersed with a polyacrylate salt and sodium carbonate or any other suitable dispersant or combination of dispersants. Thereafter, a second and third fine media milling can be carried out to further reduce the particle size of the zeolite. After the subsequent fine media milling, the slurry is subjected to the oxidative bleach and/or reductive bleach followed by separation of the zeolite particles from the slurry and bleaching agents. Such separation can be achieved by filtering the slurry, blunging the resulting filter cakes and then spray drying the resulting slurry. Other methods of separating the zeolite particles from the slurry and bleaching agents can be employed as desired.

According to our invention, one preferred method of treating zeolite ores to remove therefrom detrimental impurities, improve the bightness, ion exchange capacity and surface area thereof and reduce the particle size thereof, comprises the steps of:

(1) mixing a pulverized (100% less than 75 μm) zeolite with a dispersant and water to disperse said zeolite and form an aqueous zeolite slurry;

(2) degritting said aqueous zeolite slurry to remove grit having a particle size of 44 μm or more;

(3) removing fines having a particle size of at least 50%, or at least 70%, less than 2 μm and typically 60% less than 2 μm and containing discoloring impurities from said degritted zeolite slurry;

(4) subjecting a mixture of the zeolite slurry after fines removal step (3) and a fine grinding media to rapid agitation to effect a fine-media milling of said zeolite to at least about 20%, preferably 25% less than 2 μm;

(5) removing fines having a particle size of at least 40%, or at least 80% or 90%, less than 2 μm and typically at least 85% less than 2 μm and containing discoloring impurities from the fine-media milled zeolite slurry;

(6) subjecting the zeolite slurry from (5) above to another fine-media milling step as described in step (4) above to reduce the particle size to at least 60%, or at least 75% or 85%, less than 2 μm;

(7) removing fines having a particle size of at least 80% or at least 85% or 95%, less than 2 μm and typically at least 90% less than −2 μm and containing discoloring impurities from the fine-media milled zeolite slurry;

(8) subjecting said fine-media milled zeolite slurry after fines removal step (7) to magnetic separation to remove magnetic discoloring impurities;

(9) subjecting the zeolite slurry from step (8) above to a final fine-media milling step described in step (5) above such that the particle size of particles in the final slurry is at least 90% less than 2 μm;

(10) bleaching the resulting zeolite slurry and

(11) removing the zeolite product in a dry form from the resulting slurry.

The dry, finely ground zeolite produced by the novel methods of this invention have a very fine particle size, that is, at least 85% below 2 μm and are characterized by a Tappi brightness of at least 90. These products are very well suited for use as pigments or fillers in the manufacture of paper and are quite compatible with all paper-making materials.

Zeolites having brightness values of 83 to 90% but of somewhat coarser particle size (e.g. 30 to 80% less than 2 μm) show excellent retention when used as paper fillers and also impart good brightness and opacity to the filled sheet. Such pigments are also of interest in providing matte or dull coated paper sheets.

The ion exchange characteristics of the products of this invention are quite useful in the manufacture of carbonless carbon papers, for example, those that are pressure sensitive although these products can also be used on the heat sensitive types of carbonless carbon paper.

Carbonless paper is a type of copy paper not requiring the use of carbon paper, which consists of at least a two part form; the top sheet (called CB, for coated back) which has on its underside a coating of microcapsules containing a solution of colorless dye precursor or precursors or color former(s) in a solvent; a bottom sheet (called CF, for coated front), which contains a reagent (normally referred to as a co-reactant, e.g. an acid activated bentonite, attapulgus clay, a phenolic resin or substituted zinc salicilate) which allows the color former(s) to undergo a reaction to give a dye or dyes when pressure is applied to the top sheet to rupture the microcapsules. Intermediate sheets, coated front and back (CFB) can be used to produce multi-copy forms.

We have discovered that the zeolite product described herein is an excellent co-reactant in such carbonless papers, giving an immediate, intense color when exposed to the dye precursors from the CB sheet. The zeolite product can be used as the sole pigment in coating a CF sheet, or may be used in admixture with uncalcined and/or calcined kaolin clays or other commonly used coating pigments. Standard latex or starch adhesives may be used to bind the zeolite or zeolite/clay mixture to the paper sheet. The zeolite may be exchanged with zinc before use and such zinc exchanged zeolie (containing ca. 2% zinc, as zinc oxide, for example) gives an even more intense color development in carbonless papers. The zeolite may be exchanged with other ions such as nickel or cobalt to give reactions with special dye precursors and/or to yield color balance when multiple dye precursors are used (e.g. as in the production of "black" dyes, which may be a blend of two or more dyes which together absorb light throughout the visible spectrum to give the over-all appearance of gray, black or of neutral color).

Figure 2:
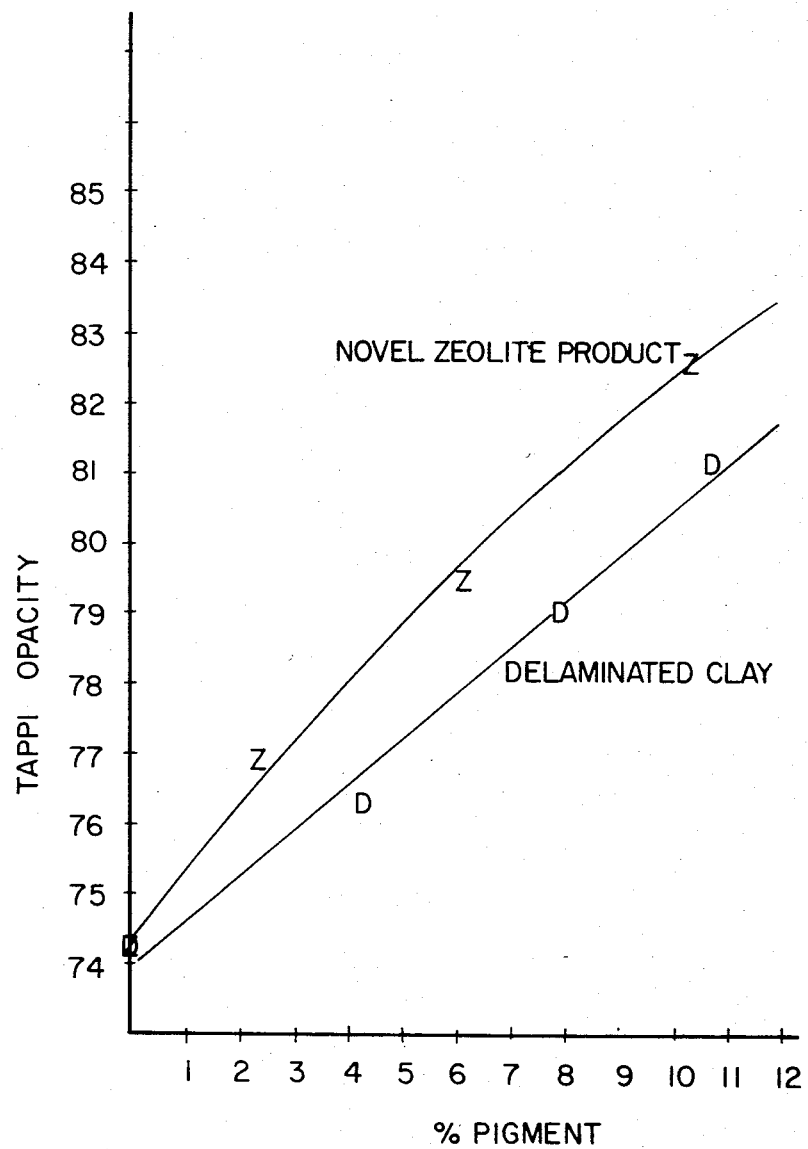
FIG. 2 is a graph illustrating plots of TAPPI opacity vs. percent filler of two papers, one made with the zeolite product of Example 1 and the other made with the same kaolin clay filler.

The zeolite product of this invention is an excellent paper filler material (pigment), imparting better opacity and brightness to a paper sheet than can be obtained from even the best uncalcined, delaminated kaolin products (which are well known for their excellent paper filler qualities). FIG. 1 is a graph wherein the TAPPI brightness is plotted against percent pigment for two papers, one made with the zeolite product of Example 1 as the filler (pigment) and the other made with a commercial quality, uncalcined, delaminated kaolin clay filler (pigment). FIG. 2 is a graph illustrating plots of TAPPI opacity vs. percent filler (pigment) of two papers, one made with the zeolite product of Example 1 as the filler (pigment) and the other made with a commercial quality, uncalcined, delaminated kaolin clay filler (pigment). These figures show the unexpected superiority of the novel zeolite product in imparting higher TAPPI brightness at any given filler loading as compared to one of the best commercial grade kaolin clays. Similarly, FIG. 2 shows the superiority in TAPPI opacity of the novel zeolite at equivalent filler loadings when compared to one of the best commercial clay fillers. The zeolie product of this invention also imparts very desirable rotogravure printing properties when used as an ingredient in paper coatings. It also imparts an unusual degree of whiteness and opacity when used in paper coatings and in paints.

The following examples are presented wherein abbreviations are used as explained below:

sec: second
min: minute
hr: hour
lb: pound mass
t: short ton of 2000 lb
μm: micron (micrometer)
ft: foot (feet)
M: mesh, U.S. standard sieve designation
ml: milliliter
gal: U.S. gallon
g: acceleration due to gravity
%: percent, by weight unless otherwise indicated
kG: kilogauss, unit of magnetic intensity
temperature: °F. unless otherwise indicated
brightness: TAPPI brightness as measured with a Technidyne Model S-4 Brightness Tester
% −2 μm: % of particles of a size less than 2 μm as measured with a Micromeritics Sedigraph 5000
% grit: % of particles in a sample having a size greater than 44 μm (325M)
F/B I: First filter, blunge cycle as described
F/B II: Second filter, blunge cycle as described
F/B III: Third filter, blunge cycle as described
F/B IV: Fourth Filter, blunge cycle as described
F/B V: Fifth filter, blunge cycle as described
F/B VI: Sixth filter, blunge cycle as described
N/D: Neutralization, dispersion operation as described
FR I: First fines removal as described
FR II: Second fines removal as described
FR III: Third fines removal as described
FR IV: Fourth fines removal as described
FR V: Fifth fines removal as described
FMM I: First fine media milling as described
FMM II: Second fine-media milling as described
FMM III: Third fine-media milling as described
MS I: First magnetic separation as described
MS II: Second magnetic separation as described

EXAMPLE 1

A. A 536 lb. batch of a zeolite ore containing 55% of clinoptilolite, 10% feldspars, 8% quartz, 7% gypsum, 2% clay minerals, and 18% mordenite (by difference) was pulverized twice to nomially 100% −200M (75 um). An acid washing solution was prepared by adding 11.25 gals. of 36% HCl solution to 150 gals. of water to give 1.99% HCl. The pulverized ore (530 lb.) and acid washing solution were combined in a tank to form a 30.5% solids slurry. The slurry was slowly agitated for about 2 hours at ambient temperature (80°–90°). The slurry had a pulp density of 26.5% solids, a pH of 0.85 and a solids content of 443 lb.

The slurry was allowed to settle for 1.25 hr. after which 12 gals. of clear liquor was decanted. The remaining slurry was subjected to F/B I wherein it was pressure filtered to 55–60% solids and the resulting filter cakes diluted to approximately the original volume with water only and blunged for 0.5 hr. The resulting slurry had a pulp density of 26.5% solids, a pH of 1.7 and a solids content of 434 lb. This slurry was subjected to F/B II as described in respect to F/B I. The resulting slurry had a pulp density of 26% solids and a solids content of 425 lb. The slurry from F/B II was subjected to F/B III similar to F/B I and F/B II. The resulting slurry had a pH of 2.04, a pulp density of 30% solids and a solids content of 423 lb.

The slurry from F/B III was subjected to N/D, while still blunging, by first adding NaOH at a level of 15 lbs./ton solids (3 lbs. NaOH pellets). After 10 mins. of blunging the pH was 4.2 and an additional pound of NaOH (0.5 lb./ton) was added. After 10 mins. of additional blunging the pH was 7.0, and a tetrasodium pyrophosphate (TSPP) dispersant was added at a level of 15 lb./ton (3 lb. TSPP powder). Blunging for about 10 mins. after this yielded a dispersed slurry.

The dispersed slurry was degritted using a 48" Sweco vibrating screen with a 325M cloth. An initial pass through the screen yielded a first product slurry having a pulp density of 25% solids and a solids content of 259 lb. The grit (oversize) slurry from the initial pass was diluted with water to 29% solids and passed through the screen again to obtain a second product slurry which was added to the first product slurry to provide a combined degritted product slurry having a pulp density of 23% solids and containing 302 lb. of solids.

The degritted slurry was subjected to FR I by feeding at 2 gal./min. to a Bird 18" diameter by 28" long solid bowl centrifuge operating at 2000 RPM. The fine fraction (overflow) was discarded and the coarse fraction (underflow) collected as a product slurry having a pulp density of 44% solids and containing 270 lb. of solids.

Table 1 below provides the TAPPI brightness, % −2 um, % grit and wt. % $Fe_2O_3$ for each stage of the operation described in Part A.

TABLE 1

| Unit Operation | TAPPI Brightness | % −2 um | % Grit | % $Fe_2O_3$ |
|---|---|---|---|---|
| Feed | — | 0 | ~60 | 4.0 |
| Pulverization | 70 | 41 | 9 | 3.7 |
| Acid Wash | 73 | — | — | — |
| F/B I | 74 | 38 | 6 | — |
| F/B II | 74 | 42 | — | — |
| F/B III | 75 | 42 | — | — |
| N/D | 72 | 42 | — | 3.9 |
| Degritting | 75 | 40 | 0 | 4.2 |

TABLE 1-continued

| Unit Operation | TAPPI Brightness | % −2 um | % Grit | % $Fe_2O_3$ |
|---|---|---|---|---|
| FR I | 79 | 20 | 0 | 2.0 |

B. A 1000 lb batch of a zeolite ore from the same geographic location as in Part A, containing 50% clinoptilolite, 8% feldspars, 16% quartz, 7% gypsum, 3% clay minerals and 16% mordenite (by difference) was pulverized twice as in Part A to give 986 lb. of −200M material. The pulverized material was slurried and reacted as in Part A in a 2.1% HCl solution at a pulp density of 20% solids. After reaction, the 525 gal. of slurry had a pulp density of 16% solids and contained 770 lb. of solids.

Removal of wash solution consisted of first allowing the slurry to settle over a weekend (~65 hr), then decanting 120 gal. of clear liquor. The remaining slurry was subjected to F/B I, as before with the filter cakes blunged in water. The 23% solids slurry, totaling 344 gal. and containing 750 lb. of solids, was diluted back to the original 525 gal. The diluted slurry was subjected to F/B II with blunging at 23% solids. The 394 gal. of slurry that resulted, containing 730 lb. of solids, was again diluted to 525 gal. The diluted slurry from F/B II was then subjected to F/B III with blunging at 25% solids.

The blunged slurry from F/B III containing 709 lb. of solids in 211 gallons volume was subjected to N/D by addition of 16 lb. NaOH per ton of solids, yielding a pH of 5.5, and subsequent addition of TSPP at a level of 10 lb./ton of solids. The dispersed slurry, containing 709 lb. of solids at 25% solids was subjected to degritting similar to Part A except that only one pass was made through a 200M (74 μm) screen. The degritted slurry was subjected to FR I in the Bird Centrifuge as in Part A except that a higher rpm (3000 vs 2000) was used. The coarse product in this case contained 580 lb. of solids.

Table 2 below provides the TAPPI brightness, % −2 um, % grit and % $Fe_2O_3$ after each stage of the operation described in Part B.

TABLE 2

| Unit Operation | TAPPI Brightness | % −2 um | % Grit | % $Fe_2O_3$ |
|---|---|---|---|---|
| Feed | — | — | — | — |
| Pulverization | 74 | — | — | 1.9 |
| Acid Wash | 74 | — | — | — |
| F/B I | 78 | 47 | 12 | — |
| F/B II | 75 | 46 | — | 2.1 |
| F/B III | 75 | 52 | — | 2.3 |
| N/D | — | — | — | — |
| Degritting | 76 | 43 | — | 1.8 |
| FR I | 80 | 23 | 6 | 0.8 |

C. The coarser fraction slurries collected from the centrifuge in Parts A and B were combined to give a slurry having a pulp density of 36% solids and containing 847 lb. of solids. The combined slurry was subjected to FMM I in one compartment of a two-compartment, 15 gal. capacity Denver attrition mill using 100 lb. of Diamonite A media (1.7 mm diameter ceramic media). A feed rate of 300 ml/min. gave a product slurry containing 802 lb. of solids with a particle size of 53% −2 μm.

The milled slurry was diluted to about 15% solids prior to treatment by FR II using a high speed (8700 rpm) Merco Model H-9 disc-nozzle centrifuge at a feed rate of about 1.2 gal./min. The product slurry contained 739 lb. of solids. This slurry was subjected to F/B IV by first adjusting to pH ~3 with concentrated $H_2SO_4$, followed by pressure filtration. The filter cakes were blunged at 35% solids, neutralized to pH 5 with NaOH, then dispersed with 10 lb. TSPP per ton of solids.

The slurry thus dispersed was subjected to FMM II in a Chicago Boiler Co. Model KD5, 5 liter Dynomill with 15 lb. of 1.3 mm Norton Z-beads (Zirconia) as grinding media. The mill was fed at 12 gal./hr. to give a product with a particle size of 84% $-2$ $\mu$m. The product slurry contained 675 lb. of solids at a pulp density of 30% solids.

This milled slurry was subjected to MSI by passing it through a high intensity (12 kG) wet magnetic separator equipped with a 4 inch diameter canister (separation chamber) filled to 8 volume % with medium grade stainless steel wool, at 10.3 in./min. The recovered slurry, having a pulp density of 22% solids and containing 624 lb. of solids, was subjected to MS II using identical conditions. The recovered slurry had a pulp density of 17% solids and contained 536 lb. of solids.

The product slurry from MS II was subjected sequentially to FR III, IV and V. Each treatment was performed with a Merco centrifuge such as that used earlier but with a slower operating speed (6700 rpm). The three fines removals were run with a feed rate of 1 gpm. The coarse fraction (product) slurry from FR III had a pulp density of 24% solids and contained 459 lb. of solids. The product slurry from FR IV had a pulp density of 32% solids and contained 432 lb. of solids. The product slurry from FR V had a pulp density of 38% solids and contained 367 lb. of solids.

The product slurry from FR V was then subjected to F/B V. F/B V was identical to F/B IV except that blunging was performed at 40% solids in the former. The slurry thus neutralized and dispersed was subjected to FMM III in the 5 liter Dynomill at a feed rate of 10 gal/hr., to give a product with a particle size of 91% $-2$ $\mu$m.

The milled slurry thus obtained was subjected to bleaching by first diluting to 20% solids and reducing the slurry pH to 3.0 with 1.5 lb. of concentrated $H_2SO_4$. The bleach, sodium dithionite (K-brite) was added at a level of 13 lb./ton of solids (1.5 lb. solid K-brite) prior to mild agitation of the slurry for about 2 hr. Slurry pH was maintained at 3.0 during bleaching by addition of 0.5 lb. more of concentrated $H_2SO_4$.

The bleached slurry contained 177 lb. of solids with a TAPPI brightness of 95. The bleached slurry was then subjected to F/B VI by first filtering as in F/B IV and V. The filter cakes were blunged at 40% solids. The resultant slurry was simultaneously neutralized and dispersed with a mixture containing 15% sodium polyacrylate dispersant (C-211) and 30% sodium carbonate in water solution. The level of addition was 50 lb. of the mixture per ton of solids or 7.5 lb. of the dispersant per ton of solids. The final slurry thus dispersed was fed to a spray dryer at 25 gal./hr. (~100 lb./hr.) to provide 150 lb. of the final product having a TAPPI brightness of 94 and a particle size of 89.5% $-2$ $\mu$m.

Table 3 below provides the TAPPI brightness, % $-2$ $\mu$m and % $Fe_2O_3$ in the product recovered after each unit operation described in Part C.

TABLE 3

| Unit Operation | TAPPI Brightness | % $-2$ um | % $Fe_2O_3$ |
|---|---|---|---|
| Combining | 81 | 22 | 0.8 |
| FMM I | 81 | 53 | 0.9 |
| F/R II | 82 | 53 | 0.9 |
| F/B IV | 83 | 56 | — |
| FMM II | 83 | 84 | 0.8 |
| MS I | 88 | 84 | 0.7 |
| MS II | 90 | 84 | 0.7 |
| FR III | 92 | 82 | 0.5 |
| FR IV | 93 | 80 | 0.3 |
| FR V | 94 | 78 | 0.2 |
| FMM III | 94 | 91 | — |
| Bleach | 95 | 0 | 0 |
| F/W VI | — | — | — |
| Spray Dry | 94 | 90 | 0.2 |

X-ray fluorescence analyses of the final product and the raw zeolite ores (starting materials) were as follows in Table 4.

TABLE 4

| Component | Novel Product (%) | Raw Zeolite Ores (%) | |
|---|---|---|---|
| | | A | B |
| $SiO_2$ | 66 | 68 | — |
| $Al_2O_3$ | 12 | 6.9 | — |
| $Fe_2O_3$ | 0.23 | 3.7 | 1.9 |
| $TiO_2$ | 0.08 | 0.20 | 0.36 |
| $Na_2O$ | 1.7 | 2.0 | — |
| CaO | 1.1 | 2.0 | 1.6 |
| MgO | 0.84 | 1.8 | 1.6 |
| $K_2O$ | 2.3 | 1.6 | — |
| ZnO | 0.02 | 0.01 | 0.01 |

The aluminosilicate final product contained 48% clinoptilolite, 12% quartz, 12% feldspars, 9% gypsum, 3% clay minerals and 16% mordenite (by difference).

The novel aluminosilicate material produced by this example compares favorably in particle size distribution to a commercial #1 paper coating grade kaolin product as shown in Table 5.

TABLE 5

| Particle Size % less than (um) | Pulverized Zeolite Ore | Novel Aluminosilicate Product | Commercial Kaolin Product |
|---|---|---|---|
| 44 | 90 | 100 | 100 |
| 6.9 | — | 100 | 100 |
| 5.0 | 56 | 99 | 99 |
| 2.0 | 41 | 90 | 90 |
| 1.0 | — | 65 | 74 |
| 0.5 | — | 39 | 55 |
| 0.25 | — | 22 | 32 |
| Mean Particle Size (um) | 3.3 | 0.68 | 0.44 |

Electron micrographs show that fibrous components normally found in the raw zeolite ore are absent in the novel aluminosilicate products, having been ground up by the fine media milling of the method of this invention. Consequently, the novel aluminosilicate products of this invention are less likely to result in lung damage upon inhalation.

The characteristics of the novel aluminosilicate final product make it well suited for pigment, extender or filler applications. Its color and other physical characteristics compare favorably to those of a commercial high brightness calcined kaolin pigment as shown in Table 6.

TABLE 6

| Parameter | Aluminosilicate Product | High Brightness Kaolin Pigment |
|---|---|---|
| Color: [1]L* | 97.37 | 98.2 |
| a* | −0.02 | −0.43 |
| b* | 1.24 | 2.88 |
| GYI[2] | 2.40 | 5.15 |
| Brightness: TAPPI | 93.9 | 93.2 |
| "Twist"[3] | 93.9 | 93.2 |
| ISO[4] | 91.9 | 91.8 |
| Bulk Density: [5]Loose | 22.6 | 41.0 |
| (lb/ft$^3$) [6]Packed | 25.8 | 56.0 |
| Specific Gravity | 2.17 | 2.69 |
| DTA[8] | Exotherms 350 and 900° C. | Exotherm 500° C. Exotherm 900° C. |
| TGA (% loss to 1100° C.)[9] | 15.4 | about 0.5% |
| Abrasion[10] (mg) | 13 | 20–25 (calcined) |
| Oil Absorption (g/100 g)[11] | 74 | 60–110 |
| Hegman[12] | 3 | 3 |
| Moisture (%)[13] | 3.1 | — |
| pH @ 10% solids | 5.0 | 6.8 |

NOTES:
[1]Determined by CIE 1976 (L*a*b*) formula as described in "Color research and application", Vol. 2, No. 1, Spring 1977, pp. 7-11, John Wiley & Sons, Inc.
[2]German Yellowness Index calculated from L*, a*, b* values.
[3]Determined by measuring the TAPPI Brightness after rotating 30 to 45° the cylinder containing the sample and the plunger while applying 30 psi pressure on the sample.
[4]TAPPI Provisional Method (1976) T 534, Appendix using filter designated "A".
[5]Determined by placing 20 g sample in 100 ml graduated cylinder and measuring volume.
[6]Determined by tapping sample in cylinder (6) 300 times using Numinco Automatic tapping device.
[7]Based on the weight of a fixed volume of the solid material of the sample theoretically excluding the volume of the pores.
[8]Differential thermal analysis using DuPont's System 94 Analyzer wherein a fine particle sample is heated and liberation of energy is indicated by peaks or exotherms and absorption of energy is indicated by endotherms.
[9]Thermogravimetric analysis measuring weight changes (due to decomposition or oxidation) on heating the sample.
[10]Measured by Einlehner Abrasion Tester and TAPPI Useful Method 603.
[11]ASTM D281-31.
[12]Measured by mixing dry sample in raw linseed oil, placing the mixture in a small cavity, scraping it from the cavity down a slot scaled from 0 to 8 equal segments, and measuring the number of the segment where separation of high grit area from mostly grit-free area occurs.
[13]Measured using an Ohaus Moisture Determination Balance.

The surface area of the novel aluminosilicate final product was measured and found to be 78 m$^2$/g which is greatly improved compared to the zeolite ore starting material which in Part B had a surface area of 33 m$^2$/g, that of Part A being about the same as the surface area of Part B.

The ion exchange capacities for the novel aluminosilicate product were measured as well as the zeolite ore starting material used in Part B. These cation exchange capacity results are given below.

| | Cation Exchange Capacities In Milliequivalents Per Gram (meq./g) | | | | | | | | | |
|---|---|---|---|---|---|---|---|---|---|---|
| | | | | | Cation Type | | | | | |
| | Total | Ca | Mg | K | Cu | Zn | Al | Sr | Cs | Na |
| Raw Material Ore[1] | 1.71 | .54 | .19 | 1.06 | .39 | .78 | .17 | .16 | .82 | 1.18 |
| Zeolite Product[2] | 1.76 | .98 | .14 | 1.31 | .67 | .92 | .25 | .45 | .87 | 1.33 |
| Syn. Z4a[3] | 4.02 | 1.98 | .36 | 3.41 | .39 | 1.18 | .04 | 1.35 | 1.61 | 4.07 |

[1]Raw material zeolite ore of Part B
[2]Novel aluminosilicate final product of Example 1
[3]A synthetic zeolite 4A identified as Sylosiv-100 manufactured by W. R. Grace Co.

In most cases, the cation exchange capacity of the novel product is greater than that of the raw material ore. In some cases, e.g., with regard to copper and aluminum, the exchange of the novel product is greater than that of the synthetic zeolite which was designed specifically as a cation exchange material. The cation exchange advantages of the novel product is even more impressive when it is considered that it contains a substantial proportion of quartz, feldspars, clay minerals, gypsum and possibly other materials which have low ion exchange capabilities. Upon removal of such materials the cation exchange capacity of the novel product (on a weight basis) would be substantially higher.

EXAMPLE 2

A 75 lb. batch of a zeolite ore from a different location than in Example 1, and containing 33% mordenite, 23% clinoptilolite, 23% feldspars, 15% quartz, 2% melilite and 4% clay minerals was pulverized twice to nominally 100% less than 200M (75 μm) The pulverized ore was naturally dispersed when mixed with water in a 15% solids slurry. The slurry thus prepared was subjected to F/R I by feeding at 2 gal./min. to a Bird 18" diameter by 28" long solid bowl centrifuge operating at 3000 rpm. The coarse fraction was collected as product in a 30% solids slurry containing 63 lb. of solids.

The F/R I product slurry was subjected to FMM I in a Chicago Boiler Co. Model KD5, 5 liter Dynomill with 15 lb. of Norton 1.3 mm Z-beads as grinding media. The mill was fed at 45 gal/hr. to give a product with a particle size of 65% −2 μm. The product slurry contained 61.1 lb. of solids at a pulp density of 28% solids.

The milled slurry was diluted to 15% solids prior to treatment by F/R II in a 6700 rpm Merco centrifuge. F/R II was run in two stages. A first pass was made at a feed rate of 600 lb./hr. (450 gal./hr) in which 30% of the feed solids reported to the coarse fraction (product). A second pass was made, using the fine fraction from the first pass as feed, at a feed rate of 300 lb./hr. (225 gal./hr.), in which 80% of the feed solids were recovered in the coarse fraction. The coarse fractions from the two passes were combined into a single F/R II product which accounted for 65% of the weight of the feed solids (40.1 lb.).

The F/R II product slurry was subjected to FMM II in the Dynomill, at a feed rate of 12 gal./hr., to give a product with a particle size of 78% −2 μm. The product slurry had a pulp density of 30% solids and contained 34.5 lb. of solids.

This milled slurry was diluted to 7–8% solids prior to treatment by F/R III in the 6700 rpm Meco centrifuge. For F/R III the centrifuge was fed at 3 gal./min. (120 lb./hr.) to give a recovery (to the coarse fraction) of 56%. The product slurry had a pulp density of 11.4% solids and contained 19 lb. of solids.

The product slurry from F/R III was subjected to MS I by passing it through a high intensity (12 kG) wet magnetic separator equipped with 2 inch diameter canister (separation chamber) filled to 8 volume % with medium grade stainless steel wool, at 20.6 in./min. The recovered slurry, having a pulp density of 6.9 % solids and containing 15 lb. of solids, was subjected to MS II under the same conditions. The product of MS II was a slurry having a pulp density of 3.2% solids and containing 11 lb. of solids.

The MS II product slurry was then subjected to F/B I wherein it was acidified to pH 2.0-2.5 with $H_2SO_4$, then dewatered to 60% solids by a combination of decantation and filtration. The filter cakes were blunged with water only to form a 30% solids slurry amounting to a volume of 5 gal. The slurry from F/B I was subjected to FMM III wherein it was fed to the Dynomill at 12 gal./hr. to give a particle size of 93.5% $-2$ $\mu m$. The FMM III product slurry of 5 gal. at 30% solids, containing 9.0 lb. of solids, was then subjected to bleaching. Slurry was adjusted to pH 3 with $H_2SO_4$ prior to addition of 0.06 lb. (15 lb./ton) of sodium dithionite (K-brite). Bleaching was affected by gentle agitation of the slurry for 1 hr after addition of the K-brite.

The slurry from the bleaching operation was subjected to F/B II identical to F/B I except that the filter cakes were oven dried at 105° C. (221° F.) for a total of about 24 hours resulting in 8 lb. of product having a TAPPI brightness of 91.3 and particle size of 89.5% $-2$ $\mu m$.

Table 7 below provides the TAPPI brightness, % $-2$ $\mu m$ and % $Fe_2O_3$ of the product recovered after each stage of the operation described in this example.

TABLE 7

| Unit Operation | TAPPI Brightness | % $-2$ um | % $FE_2O_3$ |
|---|---|---|---|
| Pulverization | 75.3 | 33 | 0.71 |
| F/R I | 78.8 | 38 | 0.93 |
| FMM I | N/A | 62.5 | N/A |
| F/R II | 83.9 | 47.5 | 0.55 |
| FMM II | 85.4 | 82 | N/A |
| F/R III | 86.1 | 78 | 0.45 |
| MS I | 89.7 | 82 | 0.35 |
| MS II | 91.9 | N/A | N/A |
| F/B I | N/A | N/A | N/A |
| FMM III | 91.9 | 93.5 | N/A |
| Bleach | 92.5 | N/A | N/A |
| F/B II | N/A | N/A | N/A |
| Dry | 91.3 | 89.5 | |

EXAMPLE 3

A half pound sample of a zeolite ore containing 20% clinoptilolite, 22% chabazite, 19% thompsonite+offretite, 11% erionite, 15% quartz, 10% feldspars and 3% clay minerals was pulverized thrice in a small Mikropul pulverizer to a size of nominally 100% less than 200M (75% less than 325M and 20% $-2$ $\mu m$). The ore thus pulverized had a TAPPI brightness of 59.

The pulverized ore was subjected to FMM I for 45 min. in a laboratory attrition mill using a charge of 0.5 lb. of ore, 1.5 lb. of Diamonite Alumasand B media (0.8 mm ceramic spheres, media-to-ore ratio=3:1), 1 lb. of water (pulp density of 33% solids) and an agitation speed of 1300 rpm. The resultant slurry had a particle size of 46% $-2$ $\mu m$ and a TAPPI brightness of 72. The milled slurry was subjected to F/R I wherein the slurry was treated at 3000 rpm for 1 min. ($\sim$100,000 g-sec) in a Lourdes laboratory centrifuge. The coarse fraction was recovered as a product having a TAPPI brightness of 73 and a particle size of 40% $-2$ $\mu m$. The fine (slimes) fraction was discarded.

The coarse product from F/R I was diluted to 33% solids and subjected to FMM II, identical to FMM I except for a longer agitation time of 2.5 hr. The product slurry from FMM II had a particle size of 86% $-2$ $\mu m$ and a TAPPI brightness of 73.

The twice-milled slurry was subjected to F/R II, a treatment identical to F/R I. The product slurry had a particle size of 77% $-2$ $\mu m$ and a TAPPI brightness of 81.

The F/R II product slurry was subjected to bleaching wherein it was treated (slow agitation for 10 minutes) with 10 lb. sodium dithionite (K-brite) per ton of solids. The bleached product had a TAPPI brightness of 84.

Table 8 below summarizes the TAPPI brightness, % $-2$ $\mu m$ and % $Fe_2O_3$ after each unit operation described above.

TABLE 8

| Unit Operation | TAPPI Brightness | % $-2$ um | % Grit | % $Fe_2O_3$ |
|---|---|---|---|---|
| Pulverization | 59 | 20 | 25 | 3.2 |
| FMM I | 72 | 46 | 5 | — |
| F/R I | 73 | 40 | 7 | 2.5 |
| FMM II | 73 | 86 | 0 | — |
| F/R II | 81 | 77 | 0 | 1.4 |
| Bleach | 84 | — | — | — |

The treatment thus improved the TAPPI brightness some 25 points, reduced iron content to well below 50% of the initial concentration and yielded a product fine enough for use as a pigment, filler or extender.

EXAMPLE 4

A 0.5 lb. portion of a zeolite ore containing chiefly Analcime was thrice pulverized as in Example 3. The pulverized material had a TAPPI brightness of 27, contained 30% grit and was also 30% $-2$ $\mu m$.

The pulverized product was subjected to FMM I, as described in Example 3, with an agitation time of 1.5 hr. The product of FMM I had a particle size of 50% $-2$ $\mu m$ and a TAPPI brightness of 52. This product was subjected to F/R I as described in Example 3. The F/R I product had a TAPPI brightness of 58 and a particle size of 43% $-2$ $\mu m$.

The product of F/R I was subjected to FMM II, as discussed earlier, with a 5 hr. residence time. The product of FMM II had a TAPPI brightness of 72 and a particle size of 95% $-2$ $\mu m$. The FMM II product was subjected to F/R II as in F/R I. The product of F/R II had a TAPPI brightness of 77 and a particle size of 92% $-2$ $\mu m$.

The TAPPI brightness of the F/R II product was increased to 80 by bleaching as in Example 3 with 10 lb. sodium dithionite (K-brite) per ton of solids. Alternatively, removal of highly magnetic material from the F/R II product with a laboratory magnetic stirrer bar increased the brightness of the product to 81 (without bleaching).

Table 9 below gives the TAPPI brightness, % grit, % $-2$ $\mu m$ and % $Fe_2O_3$ from each unit operation described above.

TABLE 9

| Unit Operation | TAPPI Brightness | % $-2$ um | % Grit | % $Fe_2O_3$ |
|---|---|---|---|---|
| Pulverization | 27 | 30 | 30 | 2.43 |
| FMM I | 52 | 50 | 5 | — |
| F/R I | 58 | 43 | 6 | 2.0 |
| FMM II | 72 | 95 | 0 | — |
| F/R II | 77 | 92 | — | 0.7 |
| MS I | 81 | — | — | — |
| or Bleaching | 80 | — | — | — |

Thus, treatment yielded more than 50 points improvement in TAPPI brightness and three-fold reduction in iron content while providing a particle size suitable for most pigment, filler or extender application.

Use in Paper Applications

Paper coating colors were prepared by adding to water the novel zeolite product with or without the clays or other pigments used and stirring until a homogenous slurry was obtained. A dispersing agent such as tetrasodium pyrophosphate, sodium polyacrylate or a blend of sodium carbonate and sodium polyacrylate was added when needed. A dispersion of latex (e.g. Dow 620), or of starch, was then stirred in slowly and the coating color was applied to the paper sheet using either a laboratory blade coater or metering rods. The coated sheets after conditioning at 70° F. and 50% RH (relative humidity), were then machine calendered and tested for the properties of interest.

The novel zeolite product can be provided with various exchange ions present. If it is desired that the exchange ion be zinc, a slurry of the novel zeolite product may be treated with e.g. one molar zinc chloride, zinc acetate or other soluble zinc salt, followed by filtering and washing until all excess zinc ion is removed. A similar procedure may be used to prepare the nickel, cobalt or other metal ion exchanged zeolite. In some cases the appropriate metal oxide, e.g. ZnO, may be blended with the novel zeolite product to give an improved carbonless paper co-reactant.

EXAMPLE 5

This example describes the preparation of carbonless paper using the novel zeolite product. Following the general procedure given above, a coating color was prepared at 48% solids, which contained 15 parts of Dow 620 latex to 100 parts of the zinc-exchanged zeolite product. Another series was prepared containing 100 parts of the mixture of the zeolite product and 2% ZnO. The mixture was diluted to 25% solids and applied by metering rod to the felt size of a 34 lb/3300 ft² ream of wood-free bond paper. Sheets were coated (one side only) at 5, 7 and 9 lb./ream. The coated sheets were then dried and machine calendered.

The sheets were compared to a standard Mead carbonless CF sheet, using a Mead bank CB sheet to print all sheets. A pressure of 1000 pli was used to make copies from the CB sheet. Print intensity (blackness) was determined by measuring the reflectance of the printed area. A lower number indicates a blacker or darker color and the lowest number possible is desired.

TABLE 10

|  | Coat Wt. (lb. ream) | Reflectance |
|---|---|---|
| Control (Standard Mead CF sheet) | 5–7 | 43.6 |
| Zeolite product exchanged with zinc | 5 | — |
|  | 7 | 40.8 |
|  | 9 | 40.6 |
| Zeolite product containing 2% ZnO | 5 | 39.8 |
|  | 7 | 37.8 |
|  | 9 | 38.0 |

These results clearly demonstrate the deeper print intensity or blackness obtained by utilizing the novel zeolites ion exchanged with zinc.

EXAMPLE 6

This example describes the preparation and testing of paper coated with the novel zeolite product in rotogravure print testing and carbonless paper testing.

Another series of paper coatings were prepared which contained various amounts of the zeolite product (zinc exchanged) with a standard #2 kaolin coating clay and a standard high brightness, low abrasion, calcined clay being the other pigment components. The coatings were applied at 5 lb./3300 ft² ream to the felt side of a 34 lb./3300 ft² ream wood-free bond paper. The sheets were then machine calendered and tested for both rotogravure printability and for carbonless paper co-reactant suitability. The sheets were coated at 46% solids using a motorized laboratory trailing blade coater.

TABLE 11

|  | Parts by Weight | | | |
|---|---|---|---|---|
|  | A | B | C | D |
| Coating Composition: | | | | |
| Parts Zeolite product | 15 | 30 | 60 | 100 |
| Parts #2 Kaolin Coating clay | 45 | 30 | 40 | 0 |
| Parts calcined kaolin clay | 40 | 40 | 0 | 0 |
| Parts Dow 620 latex (binder) | 15 | 15 | 15 | 15 |
| Sheet Properties: | | | | |
| Coat Wt. (CIS, lb/3300 ft²) | 4.8 | 4.9 | 5.1 | 4.9 |
| TAPPI Sheet Brightness | 84.9 | 85.5 | 85.2 | 86.3 |
| Opacity | 86.7 | 86.7 | 86.0 | 86.1 |
| *Heliotest, mm | 46 | 56 | 91 | 110+ |
| Carbonless Copy Reflectance** | 49.7 | 45.3 | 40.8 | 37.8 |

*Higher numbers best.
**Lower numbers best indicating a more intense, blacker or darker print.

The heliotest data indicate the number of millimeters of a printed test strip (76 Kg. print pressure) that contains twenty missing dots. The higher the number the better the rotogravure print quality (110+ indicates no missing dots on the printed strip).

The results given in Table 11 clearly demonstrate the superiority of rotogravure print and carbonless print quality of papers made with higher contents of novel zeolite product.

EXAMPLE 7

Uncoated paper containing ca. 45% groundwood and weighing 24 lb./3300 ft.² ream was coated at ca. 5 lb./side ream (coated one side) with the coating color formulations given in Table 12.

Coatings were applied to the wire side of the 24 lb./3300 ft.² rawstock at 48% solids, using a motorized bench trailing blade coater. Coated sheets were conditioned, then calendered at 150° F. and 800 pli for four passes (2/side). Rawstock and finished sheet data are given in Table 12.

TABLE 12

|  | Parts By Weight | | | | |
|---|---|---|---|---|---|
|  | Rawstock (Uncal.) | E | F | G | H |
| Coating Composition: | | | | | |
| Zeolite Product of Exp 1 | | 15 | 30 | 60 | 100 |
| #2 Coating Clay (Freeport Columbia Coating Clay) | | 45 | 30 | 40 | 0 |
| Calcined Clay, High Brightness, Low Abrasion, (Freeport Nuopaque) | | 40 | 40 | 0 | 0 |
| Latex Binder (Dow 620) | | 15 | 15 | 15 | 15 |
| Sheet Properties: | | | | | |
| Coat Wt., lb./3300 ft.² | — | 5.0 | 5.0 | 5.0 | 5.0 |
| Gloss | 7.6 | 46.4 | 44.2 | 48.1 | 40.3 |

TABLE 12-continued

| | Parts By Weight | | | | |
|---|---|---|---|---|---|
| | Raw-stock (Uncal.) | E | F | G | H |
| TAPPI Sheet Brightness | 64.7 | 69.9 | 70.7 | 68.9 | 71.2 |
| Opacity | 78.9 | 82.4 | 82.9 | 81.7 | 83.7 |

These results demonstrate the improvements in brightness and opacity imparted to the paper sheet by the novel aluminosilicate product.

The sheets were tested as carbonless paper receptor sheets, using a standard CB form. They gave an immediate, intense mark, equivalent in intensity to the control CF sheet. There was little difference in hue as the quantity of zeolite product was increased, but print intensity (darkness) became greater with increasing zeolite content.

What is claimed is:

1. A method of treating zeolite ores to remove therefrom discoloring impurities and improve the brightness characteristics thereof, said method comprising the steps of:
   (a) mixing a pulverized zeolite ore with a dispersant and water to disperse said zeolite and form an aqueous zeolite slurry;
   (b) degritting said aqueous zeolite slurry to remove grit having a particle size of 44 $\mu$m or more;
   (c) removing fines having a particle size of at least 50% less than 2 $\mu$m or less and containing discoloring impurities from said degritted zeolite slurry;
   (d) subjecting a mixture of the zeolite slurry after fines removal step (c) and a fine grinding media to rapid agitation to effect a fine milling of said zeolite to a particle size of at least 20% less than 2 $\mu$m and removing said grinding media from said fine milled zeolite slurry;
   (e) removing fines having a particle size of at least 40% less than 2 $\mu$m or less and containing discoloring impurities from the fine milled zeolite slurry;
   (f) subjecting said fine milled zeolite slurry after said fines removal step (e) to magnetic separation to remove magnetic discoloring impurities;
   (g) bleaching the resulting zeolite slurry; and
   (h) recovering the zeolite in dry form from the resulting slurry.

2. Method as claimed in claim 1 wherein said zeolite ore is chiefly clinoptilolite, chabazite, mordenite, erionite, phillipsite or analcine.

3. Method as claimed in claim 2 wherein said zeolite ore is chiefly clinoptilolite.

4. Method as claimed in claim 3 wherein said bleaching step (g) is carried out by adding an oxidative bleach to said zeolite slurry.

5. Method as claimed in claim 3 wherein said bleaching step is carried out by adding a reductive bleach to said zeolite slurry.

6. Method as claimed in claim 4 wherein said slurry after said oxidative bleach is subjected to a reductive bleach.

7. Method as claimed in claim 1 wherein said pulverized zeolite is washed with water and acid and separated from said water and acid prior to mixing with a dispersant and water in step (a).

8. Method as claimed in claim 7 wherein said zeolite is separated from said water and acid by filtration, washing with water and neutralization.

9. Method as claimed in claim 3 wherein the slurry following the removal of fines in step (e) is filtered and blunged with water and is mixed with a fine grinding media and subjected to rapid agitation to effect a second fine milling action on said zeolite.

10. Method as claimed in claim 9 wherein the zeolite slurry after magnetic separation step (f) is subjected to a second magnetic separation to remove additional magnetic discoloring impurities.

11. Method as claimed in claim 10 wherein the slurry following the second magnetic separation step is subjected to a fines removal step to remove fines having a particle size of at least 80% less than 2 $\mu$m and containing discoloring impurities from the zeolite slurry resulting from the second magnetic separation step.

12. Process as claimed in claim 11 wherein the zeolite slurry following the third fines removal step is mixed with a dispersant to disperse said zeolite and the resulting dispersed slurry is subjected to a third fine media milling wherein said zeolite slurry is mixed with a fine grinding media and subjected to rapid agitation to effect a fine milling of said zeolite to a particle size of at least 90% less than 2 microns.

13. Method as claimed in claim 9 wherein recovering step (h) comprises the steps of filtering the zeolite slurry after the bleaching step (g) and blunging the resulting filter cakes with water to form a zeolite slurry and spray drying the resulting zeolite slurry.

14. Method as claimed in claim 7 wherein said zeolite is separated from said water and acid by allowing the slurry of zeolite, water and acid to settle, decanting resulting supernatant liquid followed by filtering the remaining slurry, washing the resulting filter cakes with water and neutralizing the resulting zeolite slurries with a base.

15. Method as claimed in claim 9 wherein the dispersant used in step (a) is tetrasodium pyrophosphate.

16. Method as claimed in claim 12 wherein the dispersant used to disperse the slurry after the second magnetic separation step and the third fines removal step is a mixture of sodium polyacrylate and sodium carbonate.

17. Method as claimed in claim 7 wherein the slurry following magnetic separation is filtered and the resulting filter cakes blunged in water to form a zeolite slurry and the resulting slurry is mixed with a fine grinding media and subjected to rapid agitation to effect a fine milling action on said zeolite followed by removing said grinding media from said fine milled zeolite slurry and thereafter subjecting the resulting zeolite slurry to the bleaching step of claim 7.

18. A method of treating zeolite ores to remove therefrom detrimental impurities and improve the brightness, said method comprising the steps of:
   (a) mixing a pulverized zeolite with a dispersant and water to disperse said zeolite and form an aqueous zeolite slurry;
   (b) degritting said aqueous zeolite slurry to remove grit having a particle size of 44 $\mu$m or more;
   (c) removing fines having a particle size of at least 50% less than 2 $\mu$m and containing discoloring impurities from said degritted zeolite slurry;
   (d) subjecting a mixture of the zeolite slurry after fines removal step (c) and a fine grinding media to rapid agitation to effect a fine-media milling of said zeolite to a particle size of at least 20% less than 2 $\mu$m;

(e) removing fines having a particle size of at least 40% less than 2 μm and containing discoloring impurities from the fine-media milled zeolite slurry;

(f) subjecting the fine-media milled zeolite slurry from step (e) above to another fine-media milling step by subjecting said slurry and a fine grinding media to rapid agitation to effect a fine-media milling of said zeolite to a particle size of at least 60% less than 2 μm;

(g) removing fines having a particle size of at least 80% less than 2 μm and containing discoloring impurities from the fine-media milled zeolite slurry;

(h) subjecting said fine-media milled zeolite slurry after fines removal step (g) to magnetic separation to remove magnetic discoloring impurities;

(i) subjecting the zeolite slurry from step (h) above to a final fine-media milling step by subjecting said slurry and a fine grinding media to rapid agitation to effect a fine-media milling of said zeolite to a particle size of at least 90% less than 2 μm;

(j) bleaching the resulting zeolite slurry, and (k) recovering the zeolite product in a dry form from the resulting slurry.

19. Method as in claim 18 wherein said zeolite ore contains chiefly clinoptilolite.

20. Method as in claim 18 wherein said zeolite ore contains chiefly chabazite, erionite or analcime.

21. Method as in claim 18 wherein the dispersant used in step (a) is tetrasodium pyrophosphate, sodium silicate, or a polyacrylate.

22. Method as in claim 18 wherein said pulverized zeolite is washed with water and acid and separated from said water and acid prior to mixing with a dispersant and water in step (a).

23. Method as in claim 22 wherein said acid is hydrochloric acid, sulphuric acid or phosphoric acid.

24. Method as in claim 22 wherein the strenth of the acid solution may vary from 2 to 20 wt. percent of acid in water.

25. Method as in claim 22 wherein said zeolite is separated from said water and acid by filtration, washing with water and neutralization.

26. Method as in claim 22 wherein said zeolite is separated from said water and acid by allowing the slurry of zeolite, water and acid to settle, decanting resultant supernatant liquid prior to filtration and neutralization.

27. Method as in claim 1 wherein magnetic separation step (h) precedes the fines removal step (g).

28. Method as in claim 1 wherein the zeolite slurry after magnetic separation step (h) is subjected to a second magnetic separation to remove additional magnetic discoloring impurities.

29. Method as in claim 1 wherein said bleaching step (j) is carried out using an oxidative bleach or a reductive bleach.

30. Method as claimed in claim 29 wherein said bleach is ozone, sodium hypochlorite, potassium monopersulfate, sodium dithionite, thiourea dioxide or chlorine.

31. Method as in claim 18 wherein recovery step (k) comprises the steps of filtering the zeolite slurry after the bleaching step (j) and blunging the resulting filter cakes with water and a dispersant to form a zeolite slurry and spray drying the resulting zeolite slurry.

32. Method as in claim 31 wherein the dispersant used to disperse the slurry after the bleaching step (j) is a mixture of sodium polyacrylate and sodium carbonate.

33. Method as in claim 18 wherein recovery step (k) comprises the steps of filtering the zeolite slurry after the bleaching step (j) and drying the resultant filter cakes in a convection oven at not more than 105° C.

34. Method as in claim 18 wherein products with TAPPI brightnesses of 80 or greater and particle sizes from 20 to 89% −2 μm are recovered from any intermediate step beginning with the fines removal step (c).

35. Dry powder or slurry of finely-ground zeolite product, from which discoloring impurities have been removed, having a particle size of at least 89% less than 2 μm and a TAPPI brightness of at least 91.

36. Zeolite product as in claim 35 wherein the major zeolite constituent is clinoptilolite.

37. Dry powder of mixed zeolite product containing clinoptilolite, chabazite, erionite, thompsonite and offretite having a TAPPI brightness of at least 84 and a particle size of at least 70% −2 μm.

38. Dry powder zeolite product containing chiefly analcime and having a TAPPI brightness of at least 81 and a particle size of at least 90% −2 μm.

39. Finely ground zeolite ore from which discoloring impurities have been removed, having a particle size of at least 85% below 2 μm and a Tappi brightness of at least 90.

40. Finely ground zeolite ore as claimed in claim 19 wherein said zeolite is clinoptilolite.

41. Finely ground zeolite ore from which discoloring impurities have been removed, having a particle size of at least 30% below 2 μm and a TAPPI brightness of at least 83.

* * * * *